United States Patent [19] [11] 4,190,133
Ploeger [45] Feb. 26, 1980

[54] WHEEL BEARING PRESSURE LUBRICATOR

[76] Inventor: Kenneth C. Ploeger, 5th and Dryden, Odessa, Mo. 64076

[21] Appl. No.: 950,010

[22] Filed: Oct. 10, 1978

[51] Int. Cl.² ............... F16N 11/04; B60B 27/00
[52] U.S. Cl. ................... 184/1 D; 184/45 R; 301/108 R
[58] Field of Search .......... 184/1 D, 45 R, 45 A, 184/105 R; 301/108 A, 108 R, 108 TW; 308/93

[56] References Cited

U.S. PATENT DOCUMENTS

| 243,523 | 6/1881 | DeBremon | 184/98 |
|---|---|---|---|
| 1,389,437 | 8/1921 | Davenport | 184/45 R |
| 1,441,334 | 1/1923 | Fesler | 184/45 R |
| 1,454,922 | 5/1923 | Fesler | 184/45 R |
| 1,613,859 | 1/1927 | Waddell | 184/45 R |
| 1,717,543 | 6/1929 | Barricklow | 184/45 R |
| 1,737,838 | 12/1929 | Fuller | 184/45 R |
| 1,802,051 | 4/1931 | Gits | 184/45 R |
| 1,964,341 | 6/1934 | Dieter | 308/81 |
| 2,174,102 | 9/1939 | Catland | 308/8.2 |
| 2,457,537 | 12/1948 | Douglass | 308/187 |
| 2,483,544 | 10/1949 | Jacobson | 184/45 R |
| 2,514,799 | 7/1950 | Rubertino et al. | 184/105 B X |
| 2,952,238 | 9/1960 | Barber | 184/10 X |
| 3,077,948 | 2/1963 | Law | 184/45 R |
| 3,498,413 | 3/1970 | Krieger | 184/45 R |
| 3,648,728 | 3/1972 | Perry et al. | 137/525 |
| 3,649,080 | 3/1972 | Molinare | 301/108 R |
| 3,785,706 | 1/1974 | Vangalis | 184/45 R X |
| 3,955,852 | 5/1976 | De Puydt et al. | 184/45 R X |
| 4,058,185 | 11/1977 | Ploeger | 184/1 D |

Primary Examiner—David H. Brown
Attorney, Agent, or Firm—Fishburn, Gold & Litman

[57] ABSTRACT

A wheel bearing pressure lubricator comprising a hollow body having an open end connected with a wheel hub and forming a closure cap therefor, a piston sealingly and slidably mounted in the body and a spring member urging the piston toward the hub and bearings therein and constantly applying a positive pressure on the lubricant packing the hub. A lubrication fitting for filling the lubricator is attached to the body and an overflow aperture is disposed to the sidewall of the body at a point adjacent to the hub filled position of the piston for relieving excess lubricant pressure and a piston position indicator providing visual indication when the piston is in hub filled position and when the piston is in no pressure position at which the piston ceases to apply pressure to the lubricant in the hub.

4 Claims, 4 Drawing Figures

WHEEL BEARING PRESSURE LUBRICATOR

This invention relates to wheel bearing lubricators and in particularly to pressure lubricators for wheel hubs that are subjected to periodic immersion in water.

The principal objects of the present invention are to provide a wheel bearing pressure lubricator which applies a positive pressure on the lubricant in the hub thereby preventing water, sand and other contaminants from entering the bearing housing that has a visual indicator of the piston position in the lubricator; to provide such a lubricator which includes a spring loaded piston for constantly applying pressure on the lubricant over a substantial period of time; to provide such a lubricator having an overflow aperture disposed to the body thereof adjacent to the piston at hub filled position to relieve excess lubricant pressure; to provide such a lubricator having a closed end and an axial tubular member on which the piston is slidably and sealingly engaged; to provide such a lubricator having a closed end with a recessed portion wherein a lubricant fitting is attached and has communications through said tubular member to the interior of the body between the piston and hub; to provide such a lubricator wherein the body, piston backing member and abutment disc are constructed of die cast metal and which is economical to manufacture, efficient in use, capable of long operating life and particularly well adapted for the proposed use.

Other objects and advantages of this invention will become apparent from the following description taken in connection with the accompanying drawings wherein are set forth, by way of illustration and example, certain embodiments of this invention.

Figure 1:
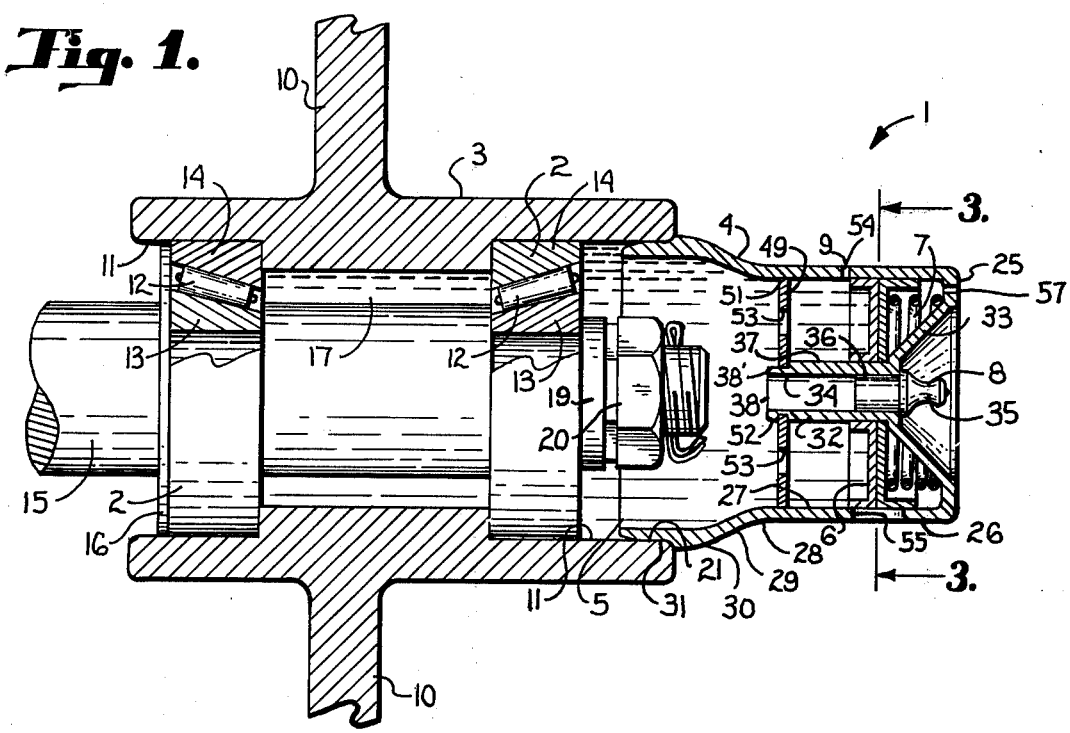
FIG. 1 is a longitudinal sectional view through a wheel bearing pressure lubricator embodying the present invention with a piston shown in hub filled position.
Figure 2:
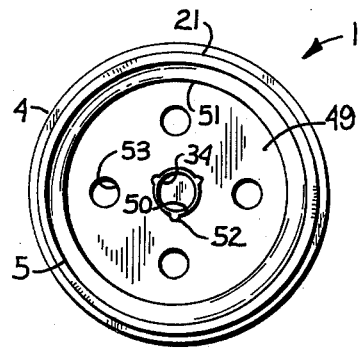
FIG. 2 is an end elevational view of the lubricator taken from the open end thereof.
Figure 3:
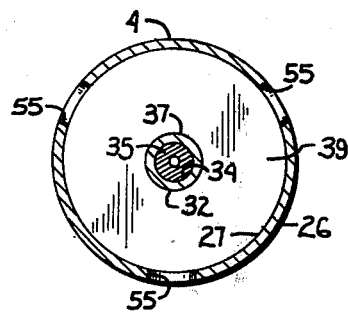
FIG. 3 is a transverse sectional view through the lubricator taken on the line 3—3, FIG. 1.
Figure 4:
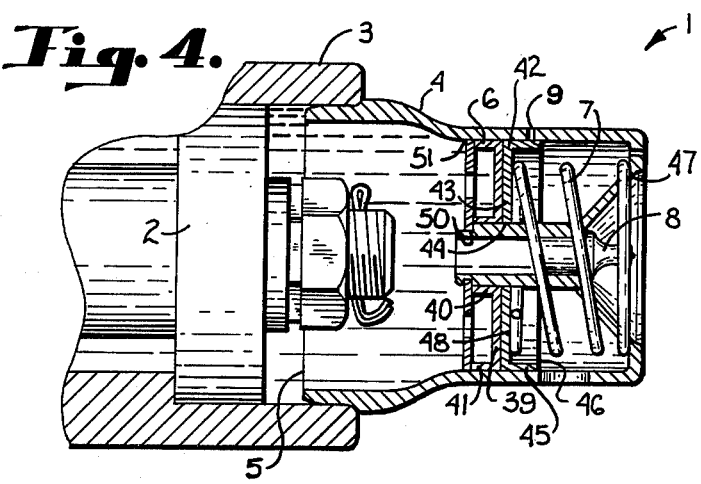
FIG. 4 is a longitudinal sectional view through the lubricator with the piston engaging the abutment and pressure ceased.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring in more detail to the drawings.

The reference numeral 1 generally designates a wheel bearing pressure lubricator for normally applying a positive pressure on lubricant for wheel bearings 2 in a wheel hub 3. The lubricator includes a hollow body 4 having an open end 5 suitably connected to the hub to form a closure cap therefor. A piston 6 is sealingly and slidably mounted within the body 4 and a spring 7 urges the piston toward the bearings 2 to constantly apply slight positive pressure on the lubricant within the hub. A lubrication fitting 8 for filling the hub is attached to the body 4 and communicates with the wheel hub 3 to apply the lubricant thereto an overflow aperture 9 being disposed through the wall of the body member at a point adjacent to the hub filled piston position for relieving excess lubricant pressure.

In the structure illustrated the wheel hub 3 is a generally cylindrical structure having radially extending structural members 10 for connection with a wheel (not shown). The hub 3 illustrated has a bore 11 in which are located inner and outer tapered roller bearings 2 each having plurality of rollers 12 and inner and outer races 13 and 14, the outer races being fixed in the bore 11 of the hub and the inner races being fixed on an axle 15. The inner end of the hub is provided with a seal member 16 which prevents the flow of lubricant from the hub cavity 17. The outer most end of the axle or shaft 15 is threaded and has connection with a retainer 19 and safety lock mechanism 20. The outer end of the bore of the hub is slightly tapered and includes a smooth interior surface 21 for receiving an open end of the body member as later described.

The body 4 is preferably shaped to be die cast from metal and has a end wall 25 closing one end the other end 5 being open. The body 4 includes a sidewall portion 26 extending from the end wall 25, said sidewall portion 26 being substantially cylindrical and having a cylindrical bore or inner surface 27 therein. In the illustrated structure, the cylindrical sidewall 26 terminates as at 28 and merges into an outwardly and forwardly curved portion 29 to a forward portion 30 which extends to the open end 5. The forward end portion has an outer surface 31 that is smooth and slightly tapered to mate with the tapered interior surface 21 at the outer end of the hub 3 to be a press fit therein.

The closed end of the body 4 includes a tubular member 32 attached thereto and communicating with the wheel hub cavity 17, said closed end wall 25 including a central recessed portion 33 with the tubular member 32 being axially of the cylindrical portion of the sidewall 26 and extending from the recessed portion of the end wall 25, said tubular portion having a bore 34. The lubricant fitting 35 is preferably of conventional type and is located in the recessed end and has a connecting end 36 preferably a press fit into the bore 34. The fitting 35 and the recess being such that the outer end of the fitting is within the recess or at least coplanar with the endmost portion of the end wall 25 so as to provide protection of the fitting 35 from impacts or other damage. The tubular member 32 has a smooth cylindrical outer surface 37 to receive the piston 6 as later described. Tubular member 32 preferably terminates in an end 38 substantially coplanar with the termination of the sidewall portion 26 as at 28. The outer surface 37 of the tubular member adjacent the end 38 is of reduced diamter from the end 38 to a shoulder 38' for purposes later described.

The piston 6 is preferably constructed of a soft flexible material such as polyvinyl chloride to improve seal integrity. It includes a circular shaped disc portion 39 with concentric inner and outer flanges or lip portions 40 and 41 respectively facing the open end of the body member and having sealing engagement with the outer surface 39 of the tubular member and the inner surface 27 of the sidewall portion of the body member respectively. A rigid backing member 42 is a part of the piston and includes a disc portion 43 having a central aperture 44 to slidably receive the tubular member 32. The backing member has an annular flange or skirt 45 with an outer surface 46 slidably engaged with the inner surface 27 of the wall 26. The flange 45 extends toward the closed end of the body member with the disc portion 43 engaged with the disc portion 39 of the piston. A resilient member urges the piston toward the hub or open end of the body member. In the illustrated structure, the resilient or spring member 7 is in the form of a helical coil spring having one end 47 engaging the closed end of the body and the other end 48 engaging the disc portion 43 of the backing member 42. As the spring may be subjected to periodic immersion in water it is preferably constructed of a non-corrosive metal such as stainless steel or the like.

The lubricator has a stop to limit the movement of the piston toward the hub. In the illustrated structure, the stop or abutment 49 is in the form of a disc having a central aperture 50 sized to fit over the reduced end portion of the tubular member 32. When so positioned the abutment engages the shoulder 38' and the periphery 51 substantially engages the interior surface 27 of the sidewall portion 26 of the body member. The stop or abutment is held on the reduced tubular member portion by staking or by peening over the end portion of the tubular member as at 52. The abuttment member disc has a plurality of apertures 53 for permitting movement of lubricant therethrough whereby the piston pressure is applied to the lubricant in the hub.

When the lubricant is applied to the hub and fills same it will force the piston toward the closed end of the body member and when it is hub filled as illustrated in FIG. 1 excess lubricant is allowed to escape through an overflow opening 9 positioned in the sidewall 26 so that it is open as the piston lip 41 moves past same toward the closed end of the body member. When the excess lubricant has escaped the spring returns the piston to a position to close the opening 9 and apply pressure to the lubricant remaining in the hub.

A piston position indicator is provided to permit a visual indication of the location of the piston 6 in both the hub filled position and in the position wherein the piston engages the stop or abutment 49 and ceases applying pressure to the lubricant in the hub. In the structure illustrated, an indicator aperture 55 is provided in the body sidewall 26 and is spaced from the overflow opening 9 and is of a longitudinal length relative to the piston and backing member 42 that said aperture is closed when the backing member flange and piston are in hub filled position. Said indicator aperture 55 is of a length and position relative to the piston lip 41 and backing member flange 45 that the rear edge 46 of the backing member flange 45 moves forward or toward the hub sufficiently to provide full opening of the indicator aperture 55 and when it is fully open the piston lip is in engagement with the abutment 49 and pressure on the lubricant and the hub is ceased. The indicator aperture 55 also serves as a vent opening however if desired an additional vent opening 57 may be placed in the end wall 25.

The entire body member 4 the piston backing member 42 and the abutment member 49 may be die cast of zinc or other suitable metal and the structure is easily assembled by placing the spring in the body member with the end 47 engaging the end wall 25 of the body member. The backing member is then inserted in the body 4 with the flange 45 extending toward the end wall 25. The piston resilient portion is then inserted and the disc portion 39 thereof engaged with the disc portion 43 of the backing member 42 and the lips of the piston extending toward the open end. The abutment member 49 is then sleeved onto the reduced end portion of the tubular member 30 and the end staked or peened over to hold the abutment member in place. The lubricator fitting 35 has an end inserted into the bore 34 and is pressed therein to fix the fitting relative to the body member to complete the assembly of the structure. The body member 4 has an end portion 31 engaged in the end of the bore 34 of the hub and is pressed therein to fix the body member to the hub and close the open end thereof so that the body member serves as cover cap for the bearing cavity. It is preferred that the exterior of the body member be suitably plated to be attractive in appearance.

In use a source of pressurized lubricant is connected to the lubricator fitting 35 applying the suitable lubricant such as a grease or heavy grade oil through the fitting and bore 34 of the tubular member into the hub cavity. To insure that the cavity is completely full of grease the user continues to inject lubricant into the lubricator fitting 35 until the pressure of the lubricant overcomes the force of the spring member 7 and moves the piston 6 rearwardly. Injections should be continued until the outer piston lip 41 passes the overflow opening 9 and excess grease is expelled through the overflow passage. The application of the lubricant is then stopped and the source of the pressurized lubricant disconnected from the fitting. The piston will then move forwardly under the force of the spring 7 past the overflow opening 9 stopping the overflow with the piston lip 41 sealed against the interior surface 27 of the sidewall 26 of the body 4. This spring pressure on the piston will provide a slight positive pressure on the lubricant during use to prevent the introduction of foreign matter into the wheel bearing. The position of the piston when the hub is filled will be evident through the indicator aperture 55 which will be closed thereby. There is preferably more than one aperture 55 circumferentially spaced around the body member so as to permit ease of inspecting the location of the piston periodically during use of the equipment mounted on the wheel. When the piston moves to fully open the indicator aperture 55 additional lubricant should be applied to refill the hub because when the indicator aperture is fully opened the piston has ceased to apply pressure to the lubricant in the hub, and in such condition there could be a possibility of foreign material entering into the bearing cavity of the hub.

It is to be understood that while I have illustrated and described certain forms of my invention it is not to be limited to the specific forms or arrangement of parts herein described and shown.

What is claimed and desired to secure by Letters Patent is:

1. A wheel bearing pressure lubricator comprising:
   (a) a hollow cap having a side wall, a central aperture, an open end and a closed end, said open end being adapted for sealing engagement with a wheel hub, said side wall having an interior surface with a substantially cylindrical shape;
   (b) a tubular member having connection with a central portion of said closed end and extending therefrom between and concentrically with said side wall;
   (c) a lubricator fitting connected with said closed end and communicating with said tubular member;
   (d) a piston structure slidably and sealingly mounted on said tubular member and having a marginal edge thereof sealingly engaging the interior surface of said side wall; said marginal edge having a defined length;

(e) a spring member positioned between said piston structure and said closed end and urging said piston structure toward the open end;

(f) a vent aperture disposed through said cap at a point adjacent to said closed end;

(g) an abutment means in said cap limiting translation movement of said piston structure toward said open end and having openings for communication of wheel hub lubricant pressure to said piston structure;

(h) an overflow opening extending through said side wall in spaced relation to said abutment means and at a point whereby the pressure of lubricant in said wheel hub moves said piston structure away from the abutment means to a filled position exposing said overflow opening to prevent excess lubricant pressure in the wheel hub;

(i) a piston position indicator aperture in said side wall with a location and size relative to the length of the piston marginal edge to be closed thereby when the piston structure is translated to said hub filled position and to be open when the piston structure engages the abutment means and ceases to apply pressure to lubricant in the wheel hub.

2. A wheel bearing pressure lubricator as set forth in claim 1 wherein:

(a) said tubular member has a reduced end portion and shoulder facing said open end;

(b) said abutment means is a disc having a central bore receiving said reduced end porton of the tubular member and a peripheral portion engaging the interior surface of said side wall, said disc being secured on said tubular member in engagement with said shoulder thereof, the travel of said piston structure is limited in a forewardmost position wherein said spring is compressed and urges said piston structure toward said disc, said disc having apertures between said tubular member and said side wall for communicating wheel hub lubricant pressure to said piston structure.

3. A wheel bearing pressure lubricator as set forth in claim 2 wherein:

(a) said piston structure has a flexible portion with a central aperture and inner and outer concentric lips facing the open end and having sliding sealing engagement with the outer surface of the tubular member and inner surface of the side wall respectively;

(b) said piston structure includes a backing member in the form of a disc with a central aperture during sliding engagement with the tubular member, said disc engaging the flexible portion and having a peripheral skirt extending therefrom toward said closed end, said outer lip of the flexible portion of the piston structure and said disc and skirt of the backing member having a total length closing said position indicator aperture when the piston structure is in hub filled position.

4. A wheel bearing pressure lubricator as set forth in claim 3 wherein:

(a) said closed end includes a central, recessed portion and said lubrication fitting is positioned therein whereby an end surface of said fitting and said closed end are respectively coplanar;

(b) said spring member comprises a helically coiled wire spring;

(c) said cap member, piston backing member and abutment disc are constructed of die cast metal.

* * * * *